US010477766B2

(12) United States Patent
Burch

(10) Patent No.: US 10,477,766 B2
(45) Date of Patent: Nov. 19, 2019

(54) VARIABLE BASECUTTER ASSEMBLY

(71) Applicant: DEERE & COMPANY, Moline, LA (US)

(72) Inventor: Guy Burch, Thibodaux, LA (US)

(73) Assignee: Deere & Company, Moline, IL (US)

( * ) Notice: Subject to any disclaimer, the term of this patent is extended or adjusted under 35 U.S.C. 154(b) by 192 days.

(21) Appl. No.: 15/799,054

(22) Filed: Oct. 31, 2017

(65) Prior Publication Data

US 2019/0124841 A1    May 2, 2019

(51) Int. Cl.
| *A01D 45/10* | (2006.01) |
| *A01D 43/063* | (2006.01) |
| *A01D 34/66* | (2006.01) |
| *A01D 34/76* | (2006.01) |

(52) U.S. Cl.
CPC ........... *A01D 45/10* (2013.01); *A01D 34/664* (2013.01); *A01D 34/667* (2013.01); *A01D 34/76* (2013.01); *A01D 43/063* (2013.01)

(58) Field of Classification Search
CPC ...... A01D 45/10; A01D 45/003; A01D 75/28; A01D 61/02; A01D 57/22; A01D 47/00; A01D 34/664; A01D 34/667; A01D 43/063; A01D 34/76
USPC ..... 56/53, 13.9, 14.5, 63, 11.9, 62; 209/138; 406/81, 100, 165; 460/59, 123
See application file for complete search history.

(56) References Cited

U.S. PATENT DOCUMENTS

| 3,791,114 | A | * | 2/1974 | Fowler | A01D 45/10 56/13.9 |
| 4,129,339 | A | | 12/1978 | Quick | |
| 4,155,602 | A | | 5/1979 | Quick | |
| 4,555,896 | A | | 12/1985 | Stiff et al. | |
| 4,924,662 | A | | 5/1990 | Quick | |
| 9,826,685 | B2 | * | 11/2017 | Mello | A01D 45/10 |
| 2016/0073580 | A1 | | 3/2016 | Scrivner et al. | |
| 2017/0280626 | A1 | * | 10/2017 | Bertino | A01D 34/416 |

FOREIGN PATENT DOCUMENTS

| BR | 202014025639 U2 | 5/2016 |
| CN | 202679993 U | 1/2013 |
| WO | 0032026 A1 | 6/2000 |

* cited by examiner

*Primary Examiner* — Robert E Pezzuto

(57) ABSTRACT

A basecutter assembly for a sugarcane harvester comprises a first cutter, a second cutter, a first feeder, a second feeder, a cutter drive, and a feed drive. The first and second cutters are adapted to sever sugarcane stalk. The first and second feeders are adapted to feed the severed sugarcane stalk. The cutter drive is coupled to the first cutter and the second cutter to rotate the first cutter and the second cutter respectively about the first rotation axis and the second rotation axis. The feed drive is coupled to the first feeder and the second feeder to rotate the first feeder and the second feeder respectively about the first rotation axis and the second rotation axis. The basecutter assembly may comprise a variator. According to another aspect, the basecutter assembly may comprise a planetary gear set.

20 Claims, 7 Drawing Sheets

VARIABLE BASECUTTER ASSEMBLY

FIELD OF THE DISCLOSURE

The present disclosure relates generally to a basecutter assembly for a sugarcane harvester.

BACKGROUND OF THE DISCLOSURE

A sugarcane harvester is configured to harvest sugarcane by severing the stalk of the sugarcane plants. The sugarcane harvester typically has a basecutter assembly to do so. In some harvesters, the basecutter assembly has a first cutter, a second cutter, and a gearbox for counter-rotating the first and second cutters to sever the sugarcane stalk.

SUMMARY OF THE DISCLOSURE

According to an aspect of the present disclosure, a basecutter assembly for a sugarcane harvester comprises a first cutter, a second cutter, a first feeder, a second feeder, a cutter drive, and a feed drive. The first and second cutters are adapted to sever sugarcane stalk. The first and second feeders are adapted to feed the severed sugarcane stalk. The first cutter and the first feeder are arranged to rotate about a first rotation axis in a manner independent of one another. The second cutter and the second feeder are arranged to rotate about a second rotation axis in a manner independent of one another. The cutter drive is coupled to the first cutter and the second cutter to rotate the first cutter and the second cutter respectively about the first rotation axis and the second rotation axis. The feed drive is coupled to the first feeder and the second feeder to rotate the first feeder and the second feeder respectively about the first rotation axis and the second rotation axis.

According to an aspect of the present disclosure, the basecutter assembly comprises a variator. The feed drive is arranged to receive a first drive input. The cutter drive may provide the first drive input to the feed drive. The variator is coupled to the feed drive to provide a variable second drive input to the feed drive. The feed drive may drive the rotational speed of the first and second feeders respectively about the first and second rotation axes in response to the first and second drive inputs. A variation in the second drive input can cause the rotational speeds of the first and second feeders to vary correspondingly. In an embodiment, the variator comprises a hydraulic variator. In another embodiment, the variator comprises an electric variator.

According to an aspect of the present disclosure, the feed drive comprises a planetary gear set. In such a case, the planetary gear set may receive the first drive input and the second drive input.

The above and other features will become apparent from the following description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
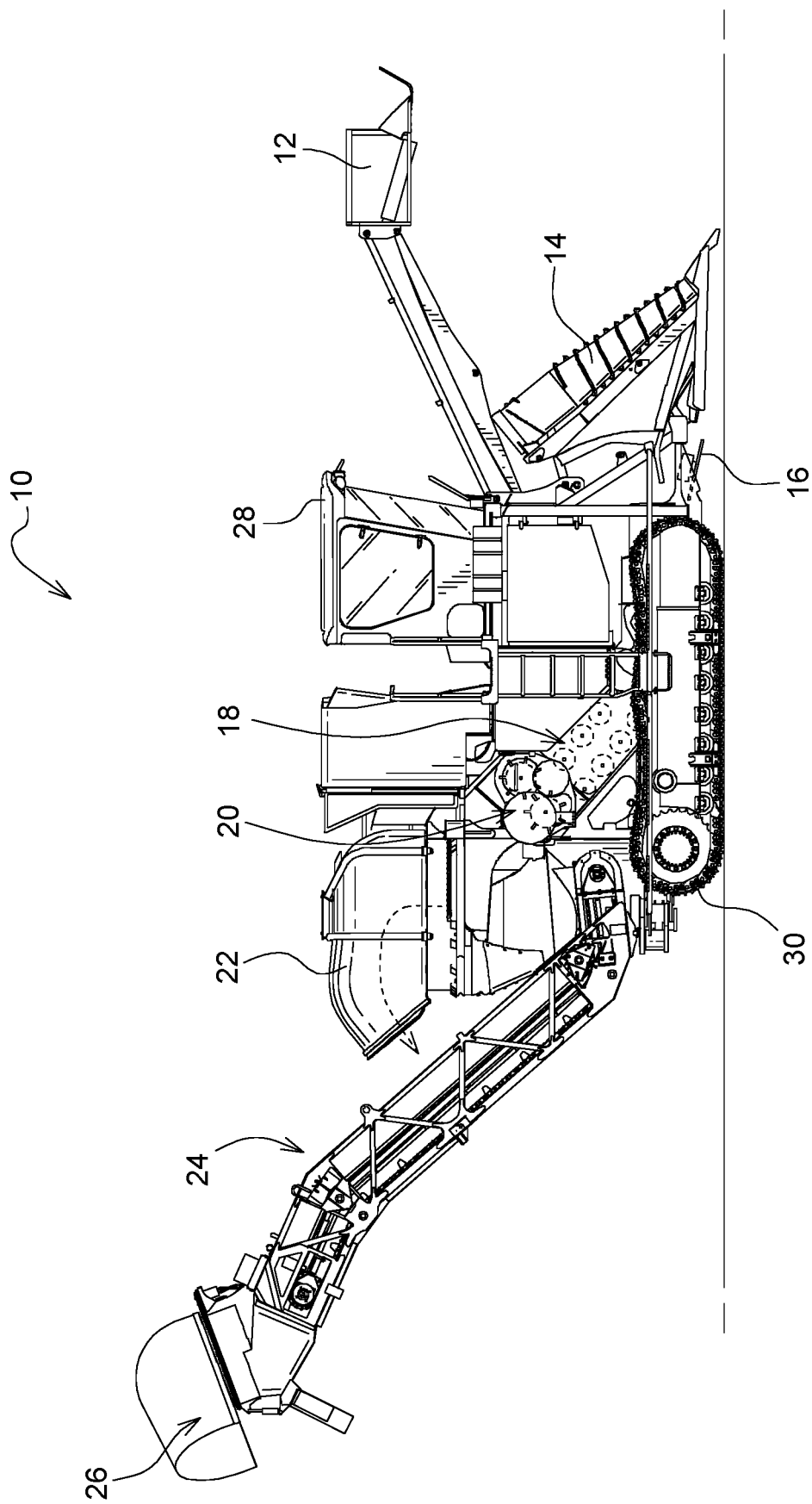
FIG. 1 is a side elevational view showing a sugarcane harvester with a basecutter assembly.

Referring to FIG. 1, a sugarcane harvester 10 is configured to harvest sugarcane. The sugarcane harvester 10 may be configured in a wide variety of ways. Illustratively, the harvester 10 comprises a topper 12, a left and a right crop divider scroll 14 (the left crop divider scroll 14 not shown), an upper knockdown roller and a lower knockdown roller (the knockdown rollers not shown), a basecutter assembly 16, a feed section 18, a chopping section 20, a primary extractor 22, an elevator 24, and a secondary extractor 26. The topper 12 is adapted to cut off a leafy top portion of sugarcane plants so as not to be ingested into the harvester 10. The left and right crop divider scrolls 14 are adapted to lift the sugarcane for feeding into the throat of the harvester 10.

The basecutter assembly 16 is adapted to sever sugarcane stalk knocked down forwardly by the knockdown rollers and to feed the severed sugarcane stalk to the feed section 18. The feed section 18 is adapted to receive from the basecutter assembly 16 a mat of severed sugarcane and to feed the mat rearwardly. The chopping section 20 is adapted to receive the mat from the feed section 18 and to cut the sugarcane stalk into billets. The primary extractor 22 is positioned downstream from the chopping section 20 and is adapted to separate debris, including, for example, crop residue (e.g., leafy material), from the billets and remove the debris from the harvester 10.

The elevator 24 is positioned at the rear of the harvester 10 to receive the cleaned flow of billets, and is adapted to convey the billets to an elevated position where the billets are discharged into a wagon to be hauled away. The secondary extractor 26 (some embodiments may not have a secondary extractor) is positioned near the top of the elevator 24, and is adapted to further separate debris from the billets and to remove the debris from the harvester 10.

The harvester 10 comprises an operator's station 28 and traction elements 30. A human operator may operate the harvester 10 from the operator's station 28. The traction elements 30 are positioned on the left and right sides of the harvester 10 for propelling the harvester 10 along the ground. Each traction element 30 may be, for example, a track unit or a ground-engaging wheel (e.g., there is one track unit on each side of the harvester 10 as shown, for example, with respect to the right side in FIG. 1).

Figure 2:
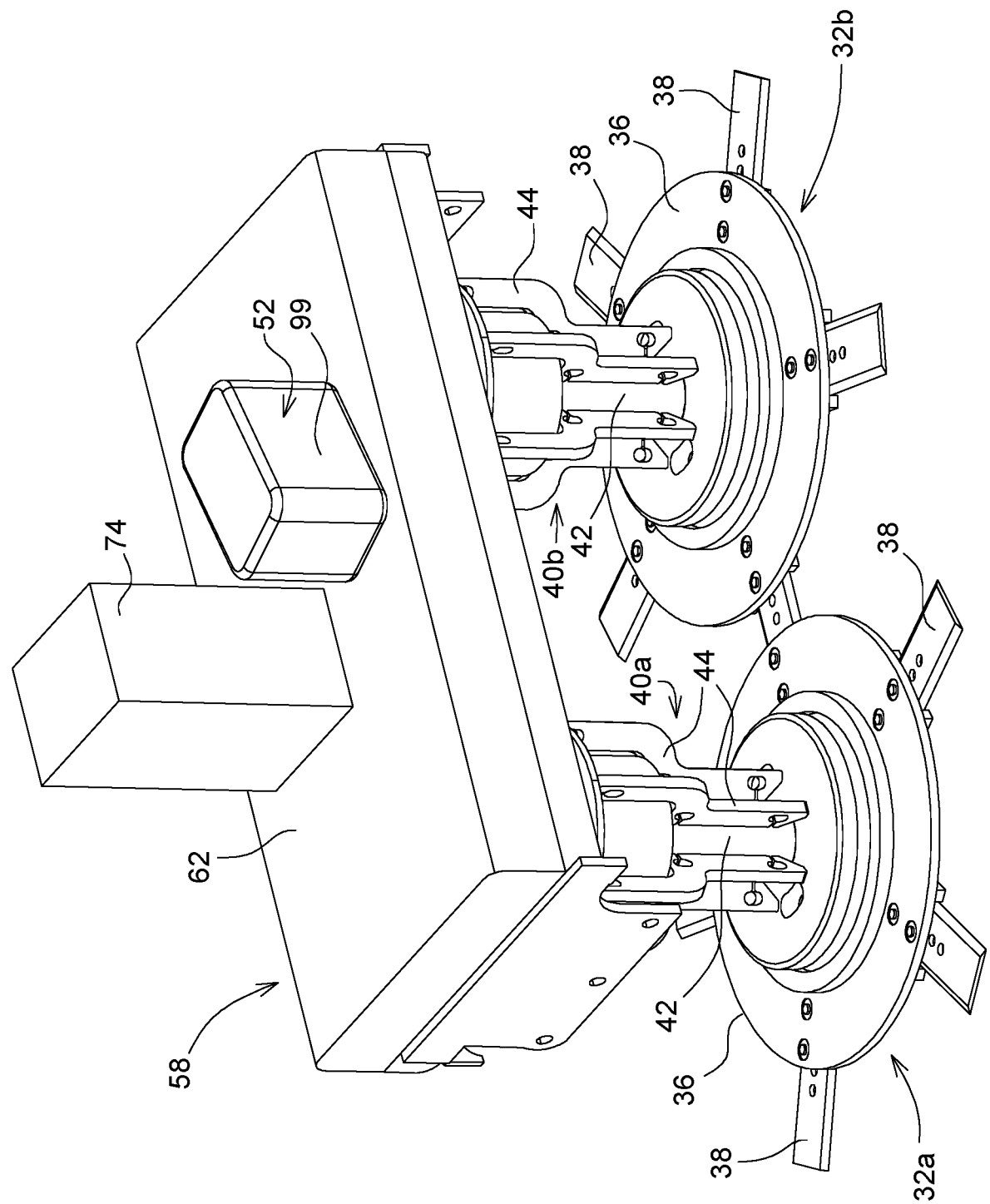
FIG. 2 is a perspective view showing a basecutter assembly with a gearbox, first and second cutters adapted to sever sugarcane stalk, and first and second feeders adapted to feed the severed sugarcane.
Figure 3:
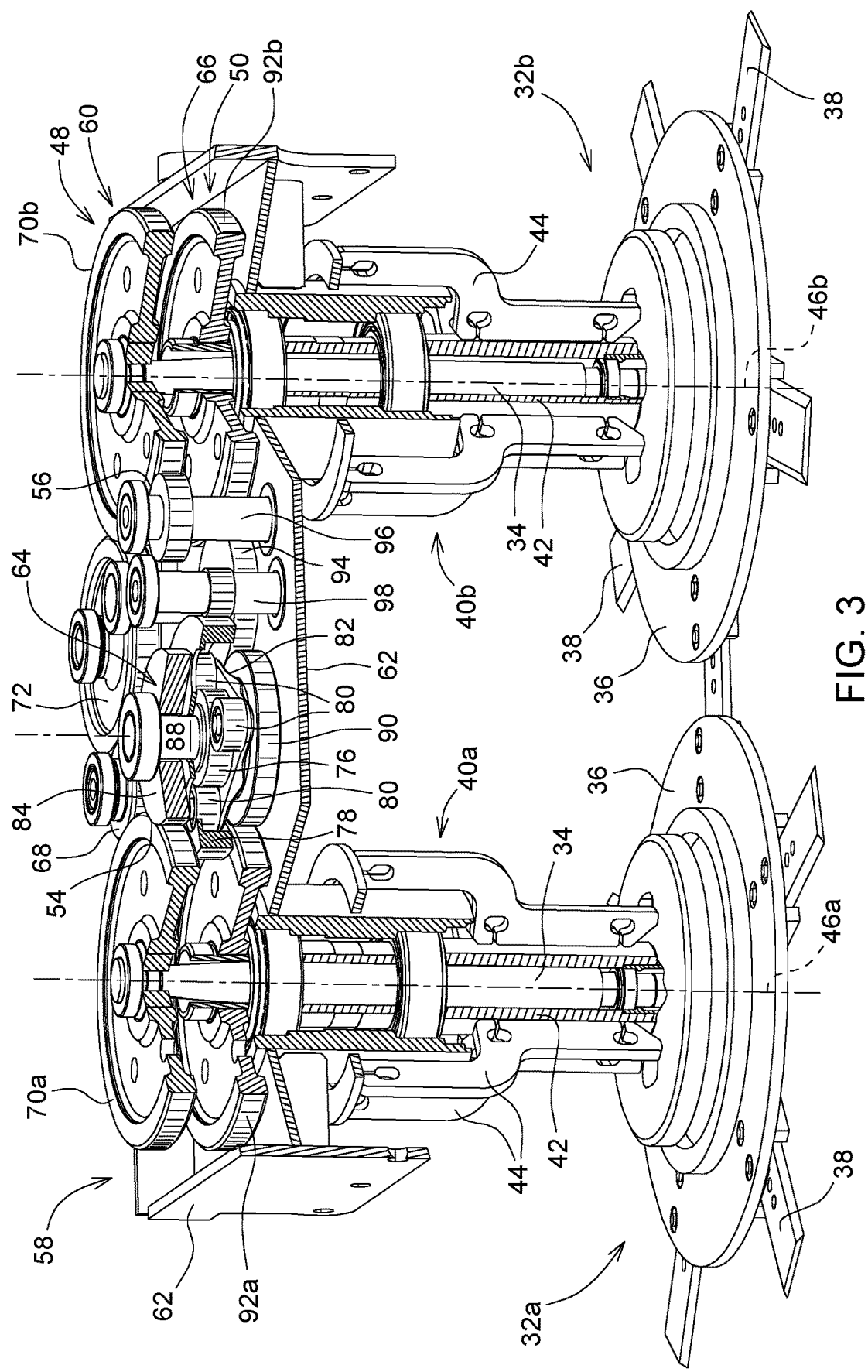
FIG. 3 is a perspective view, with portions broken away, showing the basecutter assembly.

Referring to FIGS. 2 and 3, the basecutter assembly 16 comprises a first cutter 32a and a second cutter 32b. The first and second cutters 32a, 32b are adapted to sever sugarcane stalk at a location near the ground. Illustratively, each cutter 32a, 32b comprises a rotatable shaft 34 and a cutting disk 36 mounted to the shaft 34 for rotation therewith. The cutting disk 36 comprises blades 38 positioned about the periphery of the cutting disk 36. The cutting disks 36 are counter-rotated to sever sugarcane stalk.

The basecutter assembly 16 comprises a first feeder 40a and a second feeder 40b. The first and second feeders 40a, 40b are adapted to feed the severed sugarcane stalk. Illustratively, each feeder 40a, 40b comprises a hollow, rotatable shaft 42 and a plurality of vertical ribs 44 mounted to the shaft 42 for rotation therewith. The ribs 44 are adapted to bat severed sugarcane stalk toward the feed section 18 upon rotation of the shaft 42.

The first cutter 32a and the first feeder 40a are arranged to rotate about a first rotation axis 46a in a manner independent of one another. The shaft 34 of the first cutter 32a is positioned within the hollow shaft 42 of the first feeder 40a, such that those shafts 34, 42 are rotatable relative to one another via bearings positioned therebetween (e.g., an upper bearing and two lower bearings). An upper portion of the shaft 42 of the first feeder 40a is positioned within a lower portion of a housing 62 for rotation relative thereto about the first rotation axis 46a via bearings positioned between the upper portion of the shaft 42 of the first feeder 40a and the lower portion of the housing 62 (e.g., two bearings).

The second cutter 32b and the second feeder 40b are arranged to rotate about a second rotation axis 46b in a manner independent of one another. The shaft 34 of the second cutter 32b is positioned within the hollow shaft 42 of the second feeder 40b, such that those shafts 34, 42 are rotatable relative to one another via bearings positioned therebetween (e.g., an upper bearing and two lower bearings). An upper portion of the shaft 42 of the second feeder 40b is positioned within a lower portion of the housing 62 for rotation relative thereto about the second rotation axis 46b via bearings positioned between the upper portion of the shaft 42 of the second feeder 40b and the lower portion of the housing 62 (e.g., two bearings).

Figure 4:
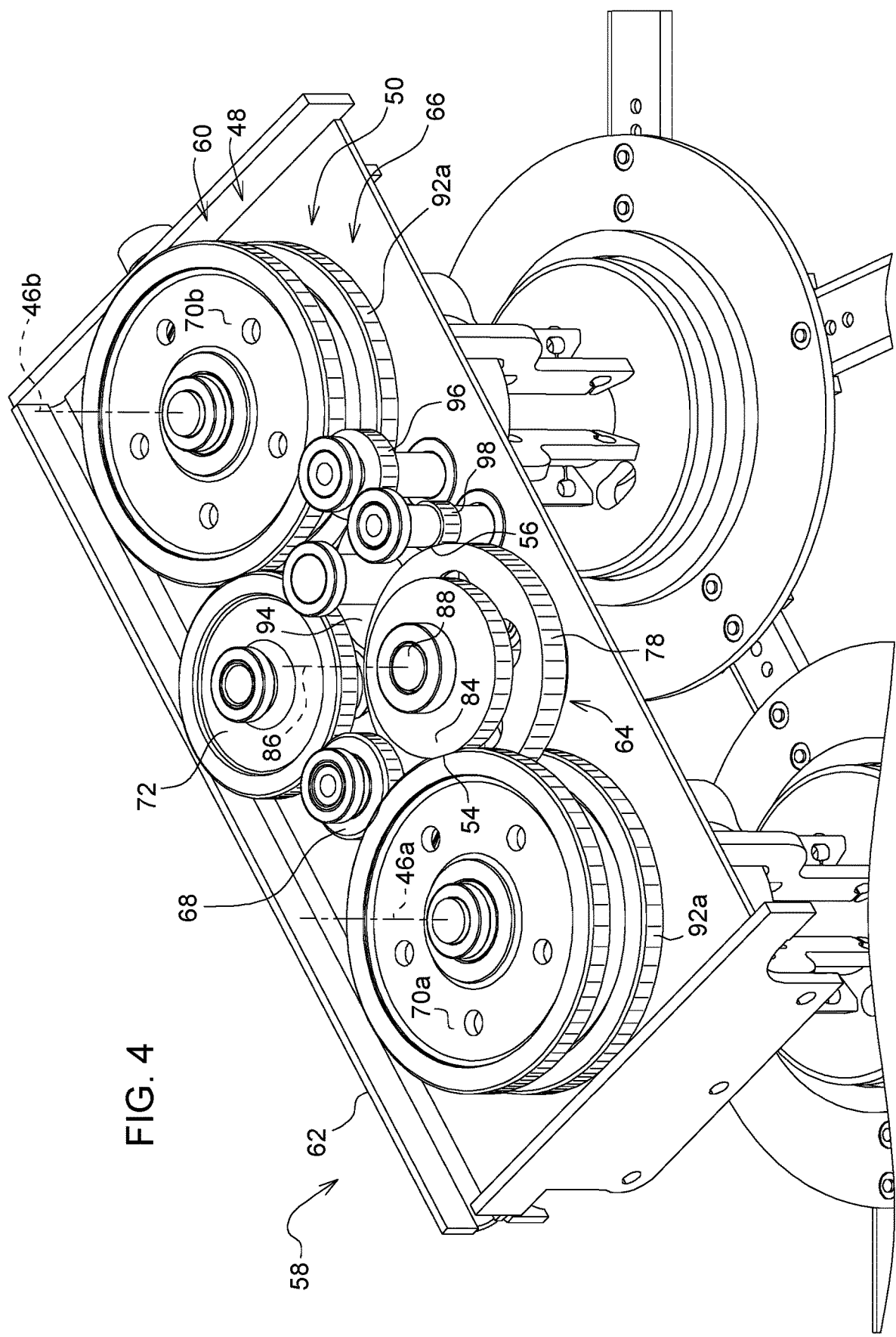
FIG. 4 is a perspective view showing a layout of gears in the housing of the gearbox.
Figure 5:
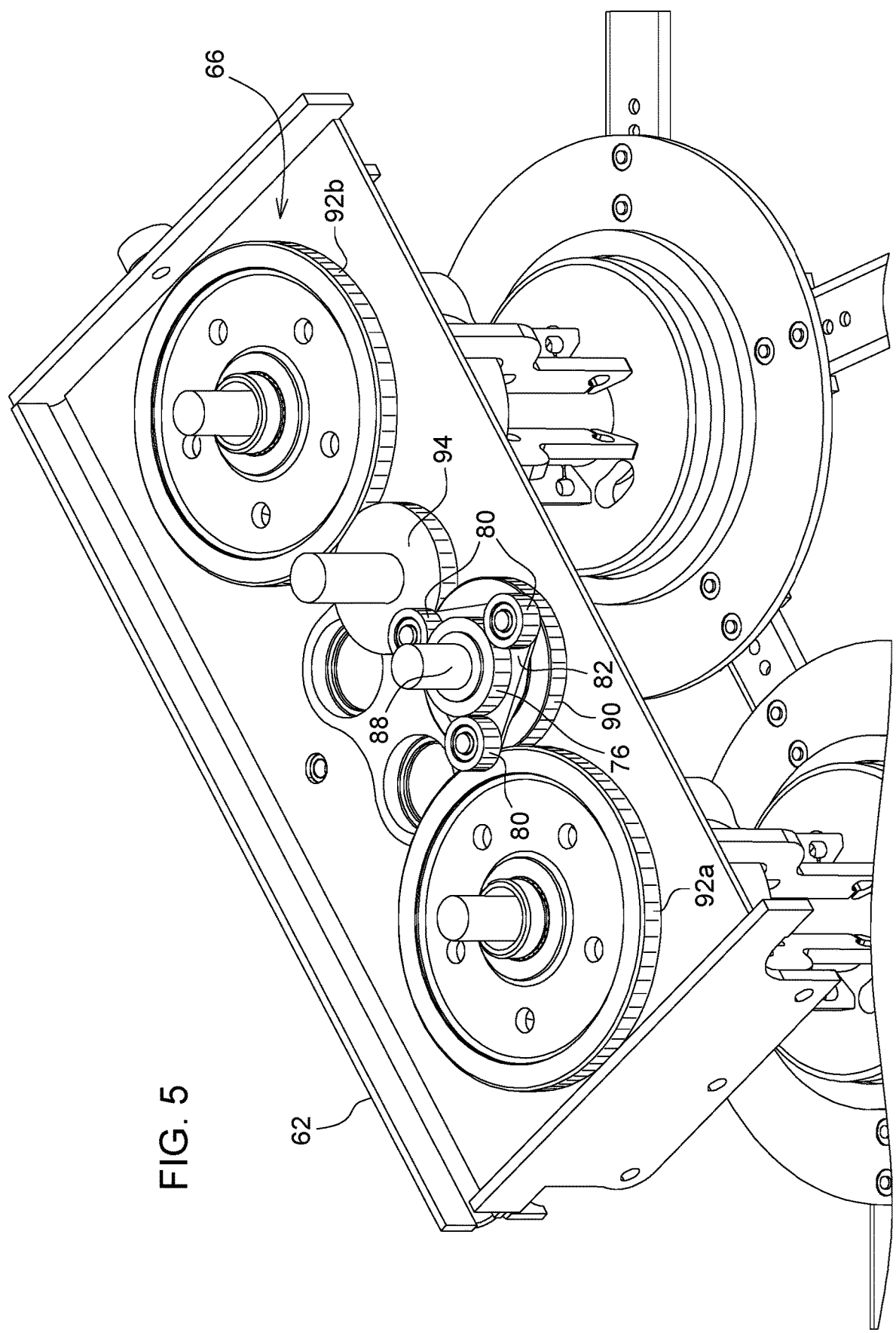
FIG. 5 is a perspective view showing a lower rank of the gear layout.
Figure 6:
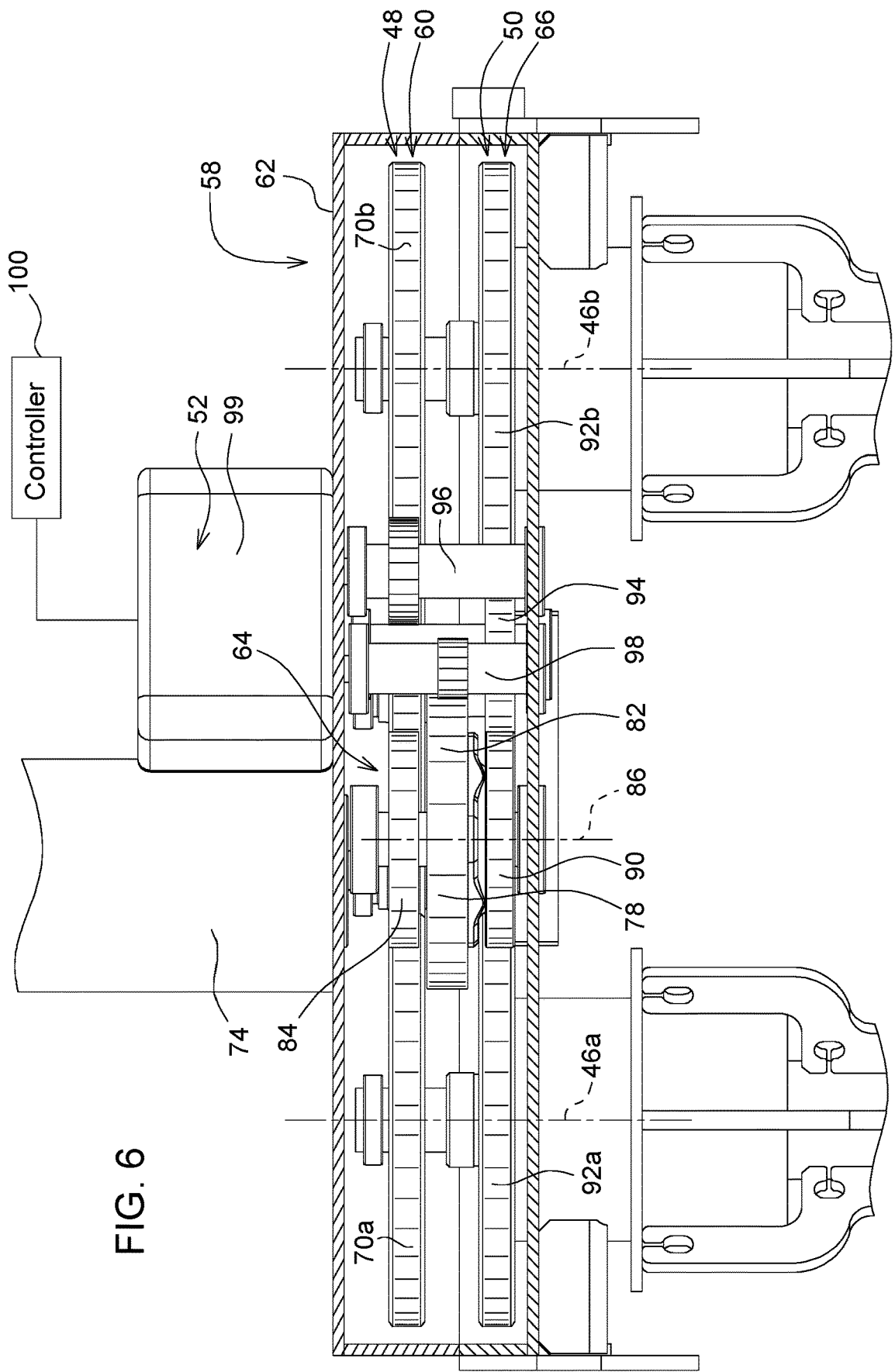
FIG. 6 is a side elevational view, with portions broken away, showing a hydraulic variator coupled to the gearbox.

Referring to FIGS. 4-6, the basecutter assembly 16 comprises a cutter drive 48, a feed drive 50, and a variator 52 (shown in simplified form). The cutter drive 48 is coupled to the first cutter 32a and the second cutter 32b to rotate the first cutter 32a and the second cutter 32b respectively about the first rotation axis 46a and the second rotation axis 46b. The feed drive 50 is coupled to the first feeder 40a and the second feeder 40b to rotate the first feeder 40a and the second feeder 40b respectively about the first rotation axis 46a and the second rotation axis 46b. The feed drive 50 is arranged to receive a first drive input 54. The variator 52 is coupled to the feed drive 50 to provide a variable second drive input 56 to the feed drive 50, so as to vary the rotational speed of the feeders 40a, 40b respectively about the rotation axes 46a, 46b.

The basecutter assembly 16 comprises a gearbox 58. The cutter drive 48 comprises a cutter gear set 60 included in the gearbox 58 and positioned in a housing 62 of the gearbox 58. Illustratively, the cutter drive 48 is configured as the cutter gear set 60. The feed drive 50 comprises a planetary gear set 64 and a feed gear set 66. The planetary and feed gear sets 64, 66 are positioned in the housing 62.

The cutter gear set 60 comprises a pinion 68, a first cutter output gear 70a, a second cutter output gear 70b, and a cutter idler gear 72, each of which is rotatably mounted to the housing 62 (e.g., via bearings). An actuator 74 of the harvester 10 (shown in simplified form) is coupled to the pinion 68 to drive the pinion 68. The pinion 68 engages the first cutter output gear 70a and the cutter idler gear 72. The cutter idler gear 72 further engages the second cutter output gear 70b. The first cutter output gear 70a is coupled to the first cutter 32a to rotate the first cutter 32a about the first rotation axis 46a. The first cutter output gear 70a and the first cutter 32a are co-axial with one another relative to the first rotation axis 46a. The second cutter output gear 70b is coupled to the second cutter 32b to rotate the second cutter 32b about the second rotation axis 46b. The second cutter output gear 70b and the second cutter 32b are co-axial with one another relative to the second rotation axis 46b.

The actuator 74 is mounted to the housing 62. The actuator 74 comprises a body positioned outside and mounted to the housing 62 and a shaft extending through a wall of the housing 62 into the housing 62 and coupled to the pinion 68 to drive the pinion 68. The shaft is rotatably mounted to the housing 62 via a bearing and received in a hole of the pinion 68 (the hole shown in simplified form).

The actuator 74 may be any suitable actuator. Illustratively, the actuator 74 is a hydraulic motor driven by a hydraulic pump (not shown), which in turn may be driven by the engine (not shown) of the harvester 10 at or variable to the engine speed. In other embodiments, the actuator 74 may be a mechanical drive driven by the engine at or variable to the engine speed. In yet other embodiments, the actuator 74 may be an electric motor.

The planetary gear set 64 comprises a sun gear 76, a ring gear 78, planet gears 80 (e.g., three planet gears 80) engaging the sun gear 76 and the ring gear 78, a planet carrier 82 coupled to the planet gears 80, and a planetary input gear 84. The planetary input gear 84 is coupled to the sun gear 76 to rotate therewith about a planetary axis 86 of the planetary gear set 64. The sun gear 76 and the planetary input gear 84 are fixed to a shaft 88 of the planetary gear set 64 such that the gears 76, 84 rotate together. One or both gears 76, 84 may be splined, welded, or integrated (one-piece with) to the shaft 88.

The feed gear set 66 comprises a feed input gear 90. The feed input gear 90 is coupled to the planet carrier 82. The feed input gear 90 may be coupled to a shaft of the planetary gear set 64 to rotate therewith about the planetary axis 86. The shaft is rotatably mounted to the housing 62 via a bearing. The feed input gear 90 may be splined, pressed, or welded to the planet carrier 82, or may be integrated with the planet carrier 82 so as to be one-piece therewith (e.g., a casting). In some embodiments, the planet carrier 82 may be keyed, and the feed input gear 90 may be pressed onto the keyed planet carrier 82.

The feed gear set 66 is coupled to the first and second feeders 40a, 40b to rotate the first and second feeders 40a, 40b respectively about the first and second rotation axes 46a, 46b. The feed gear set 66 comprises a first feed output gear 92a, a second feed output gear 92b, and a feed idler gear 94, each of which is rotatably mounted to the housing 62 (e.g., via bearings). The feed input gear 90 engages the first feed output gear 92a and the feed idler gear 94. The feed idler gear 94 further engages the second feed output gear 92b. The first feed output gear 92a is coupled to the first feeder 40a to rotate the first feeder 40a about the first rotation axis 46a. The first feed output gear 92a and the first feeder 40a are co-axial with one another, along with the first cutter output gear 70a and the first cutter 32a, relative to the first rotation axis 46a. The second feed output gear 92b is coupled to the second feeder 40b to rotate the second feeder 40b about the second rotation axis 46b. The second feed output gear 92b and the second feeder 40b are co-axial with one another, along with the second cutter output gear 70b and the second cutter 32b, relative to the second rotation axis 46b.

The cutter drive 48 is coupled to the feed drive 50 to provide the first drive input 54 to the feed drive 50. The cutter drive 48 is coupled to the planetary gear set 64 to provide the first drive input 54 to the planetary gear set 64 to drive the sun gear 76, rotating the sun gear 76 about the planetary axis 86. The first cutter output gear 70a is coupled to the planetary gear set 64 to drive the sun gear 76. The first cutter output gear 70a engages the planetary input gear 84 to rotate the planetary input gear 84 and the sun gear 76 fixed thereto about the planetary axis 86.

The variator 52 is arranged to vary the rotational speed of the first and second feeders 40a, 40b respectively about the first and second rotational axes 46a, 46b relative to the rotational speed of the first and second cutters 32a, 32b respectively about the first and second rotational axes 46a, 46b. The variator 52 is coupled to the planetary gear set 64 to provide the second drive input 56 to the planetary gear set 64, to rotate, for example, the ring gear 78 about the planetary axis 86. As such, the variator 52 may be coupled to the ring gear 78 to drive the ring gear 78.

The variator 52 is configured, for example, as a hydraulic variator. As such, the variator 52 comprises an input member 96 coupled to an input shaft of the variator 52 (not shown) and an output member 98 coupled to an output shaft of the variator 52 (not shown). Each of the input member 96 and the output member 98 comprises a shaft and a gear mounted thereto. The input shaft of the variator 52 is received in a hole of the input member 96 (the hole shown in simplified form), and the output shaft of the variator 52 is received in a hole of the output member 98 (the hole shown in simplified form). The cutter gear set 60 is coupled to the input member 96 to drive the variator 52. The second cutter output gear 70b engages the input member 96 to drive the input member 96. The second cutter output gear 70b engages a gear of the input member 96.

The variator 52 is coupled to the ring gear 78 to drive the ring gear 78. The output member 98 is so coupled to the ring gear 78. The output member 98 engages the ring gear 78 to drive the ring gear 78. A gear of the output member 98 engages the ring gear 78.

The planetary gear set 64 is coupled to the feed gear set 66 to drive the feed gear set 66. The planet carrier 82 is so coupled to the feed gear set 66. The planet carrier 82 is coupled to the feed input gear 90 to rotate the feed gear input gear 90. The feed input gear 90 engages the feed idler gear 94 and the first feed output gear 92a.

The variator 52 is mounted on the housing 62. The variator 52 comprises a body 99 mounted on and positioned external to the housing 62. The body 99 comprises an internal pump and motor driven by the pump, the pump and the motor mounted within a housing of the body 99. The input and output members 96, 98 extend through a wall of the housing 62 into the housing 62 and are rotatably mounted to the housing 62 via bearings (e.g., an upper bearing and a lower bearing).

The variator 52 may be under the control of a controller 100. In such a case, the controller 100 is electrically coupled to the variator 52 to control operation of the variator 52. The controller 100 may control the pump side of the variator 52 or the motor side of the variator 52, or both. The controller 100 comprises a processor and a memory with instructions stored therein which, when executed by the processor, causes the processor to output control signals to the variator 52 to vary rotation of the output member 98, and thus vary rotation of the feeders 40a, 40b about their respective rotation axes 46a, 46b.

The hydraulic variator 52 may be operated in forward or reverse directions in order to rotate the feeders 40a, 40b in corresponding forward or reverse directions. In the forward direction of the feeders 40a, 40b, the feeders 40a, 40b cooperate to feed severed sugarcane stalk into the feed section 18. In the reverse direction of the feeders 40a, 40b, the feeders 40a, 40b cooperate to move severed sugarcane stalk away from the feed section 18 (e.g., for unclogging).

The actuator 74 applies a rotary drive input to the pinion 68. This input is the main drive input to the gearbox 58. Being in mesh with the first cutter output gear 70a and the cutter idler gear 72, the pinion 68 transfers power to the first cutter output gear 70a and the cutter idler gear 72. Rotation of the first cutter output gear 70a causes the first cutter 32a to rotate about the first rotation axis 46a. Being in mesh with the planetary input gear 84, the first cutter output gear 70a applies the first drive input 54 to the planetary input gear 84 so as to transfer power thereto. Being in mesh with the second cutter output gear 70b, the cutter idler gear 72 transfers power to the second cutter output gear 70b. Rotation of the second cutter output gear 70b causes the second cutter 32b to rotate about the second rotation axis 46b. The first and second cutters 32a, 32b counter-rotate relative to one another.

The cutter drive 48 powers the variator 52. Being in mesh with the input member 96, the second cutter output gear 70b powers the input member 96. The controller 100 may vary internal operation of the variator 52 such that, being in mesh with the ring gear 78, the output member 98 applies the second drive input 56 to the ring gear 78 so as to transfer power thereto.

Having received the drive inputs 54, 56, the planetary gear set 64 transfers variable power to the feed gear set 66. Being in mesh with the first feed output gear 92a and the feed idler gear 94, the feed input gear 90 transfers power to those gears 92a, 94. Rotation of the first feed output gear 92a causes the first feeder 40a to rotate about the first rotation axis 46a. Being in mesh with the second feed output gear 92b, the feed idler gear 94 transfers power to the second feed output gear 92b. Rotation of the second feed output gear 92b causes the second feeder 40b to rotate about the second rotation axis 46b. The first and second feeders 40a, 40b counter-rotate relative to one another.

Figure 7:
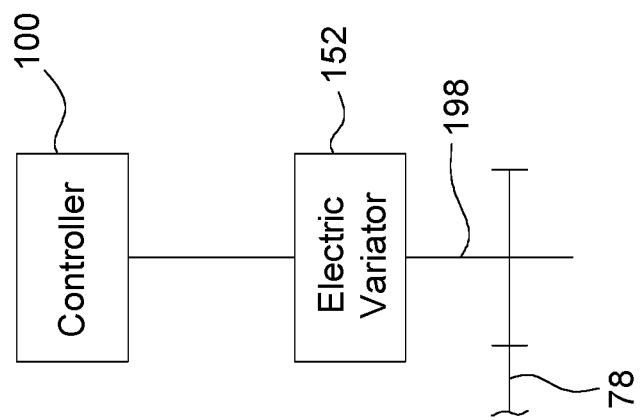
FIG. 7 is a diagrammatic view showing another embodiment with an electric variator.

Referring to FIG. 7, in another embodiment, the variator may be an electric variator 152 in place of the hydraulic variator 52. In such a case, the variator 152 is configured as an electric motor. The variator 152 may be mounted on the housing 62 so as to be positioned external to the housing 62. The variator 152 may be under the control of the controller 100 in order to receive control signals therefrom to vary rotation of its output to vary rotation of the feeders 40a, 40b. The electric variator 152 comprises an output member 198, but not an input member corresponding to input member 96. As such, unlike the hydraulic variator 52, the electric variator 152 is not driven by the cutter drive 48. The output member 198 comprises an output motor shaft and a gear. The motor shaft is rotatably mounted to the housing 62 via bearings (upper bearing and lower bearing). The gear is mounted to the motor shaft for rotation therewith and is coupled to the ring gear 78 such that the gear meshes with the ring gear 78.

Use of a variator 52 may eliminate at least one stand-alone component compared to a system having two hydraulic circuits, one for operating the cutter drive and the other for operating the feed drive of a basecutter assembly, and each circuit with a stand-alone pump and a stand-alone motor. With the variator 52, the second stand-alone pump may be eliminated. In such a case, the variator 52 may avoid, for example, the cost, complexity, space claim, and possible reduced life and reliability associated within having a second stand-alone pump. In a multi-row harvester, the basecutter assembly for each row may similarly employ a variator 52, allowing elimination of a stand-alone pump in connection with that row.

While the above describes example embodiments of the present disclosure (with various components shown in simplified form), these descriptions should not be viewed in a limiting sense. Rather, other variations and modifications may be made without departing from the scope and spirit of the present disclosure as defined in the appended claims.

What is claimed is:

1. A basecutter assembly for a sugarcane harvester, the basecutter assembly comprising:
a first cutter and a second cutter, the first and second cutters adapted to sever sugarcane stalk;
a first feeder and a second feeder, the first and second feeders adapted to feed the severed sugarcane stalk, the first cutter and the first feeder arranged to rotate relative to one another about a first rotation axis, the second cutter and the second feeder arranged to rotate relative to one another about a second rotation axis;
a cutter drive coupled to the first cutter and the second cutter to rotate the first cutter and the second cutter respectively about the first rotation axis and the second rotation axis;
a feed drive coupled to the first feeder and the second feeder to rotate the first feeder and the second feeder respectively about the first rotation axis and the second rotation axis, the feed drive arranged to receive a first drive input; and
a variator coupled to the feed drive to provide a variable second drive input to the feed drive.

2. The basecutter assembly of claim 1, wherein the variator comprises a hydraulic variator.

3. The basecutter assembly of claim 1, wherein the variator comprises an electric variator.

4. The basecutter assembly of claim 1, wherein the cutter drive is coupled to the feed drive to provide the first drive input to the feed drive.

5. The basecutter assembly of claim 1, wherein the feed drive comprises a planetary gear set.

6. The basecutter assembly of claim 5, wherein the cutter drive is coupled to the planetary gear set to provide the first drive input thereto.

7. The basecutter assembly of claim 6, wherein the variator is coupled to the planetary gear set to provide the second drive input thereto.

8. The basecutter assembly of claim 5, wherein the variator is coupled to the planetary gear set to provide the second drive input thereto.

9. The basecutter assembly of claim 5, wherein the feed drive comprises a feed gear set coupled to the first feeder and the second feeder to rotate the first feeder and the second feeder respectively about the first rotation axis and the second rotation axis, and the planetary gear set is coupled to the feed gear set to drive the feed gear set.

10. The basecutter assembly of claim 5, wherein the planetary gear set comprises a sun gear, a ring gear, planet gears engaging the sun gear and the ring gear, and a planet carrier coupled to the planet gears, the cutter drive is coupled to the planetary gear set to provide the first drive input thereto to rotate the sun gear, and the variator is coupled to the planetary gear set to provide the second drive input thereto to rotate the ring gear, the feed drive comprises a feed gear set coupled to the first feeder and the second feeder to rotate the first feeder and the second feeder respectively about the first rotation axis and the second rotation axis, and the planet carrier is coupled to the feed gear set to drive the feed gear set.

11. The basecutter assembly of claim 10, wherein the variator is configured as a hydraulic variator and comprises an input member and an output member, the cutter drive comprises a cutter gear set coupled to the input member to drive the variator, and the output member is coupled to the ring gear to drive the ring gear.

12. The basecutter assembly of claim 11, wherein the planetary gear set comprises a planetary input gear coupled to the sun gear to rotate therewith about a planetary axis of the planetary gear set, the cutter gear set comprises a first output gear and a second output gear, the first output gear is coupled to the first cutter to rotate the first cutter about the first rotation axis and engages the planetary input gear, and the second output gear is coupled to the second cutter to rotate the second cutter about the second rotation axis and engages the input member.

13. A basecutter assembly for a sugarcane harvester, the basecutter assembly comprising:
a first cutter and a second cutter, the first and second cutters adapted to sever sugarcane stalk;
a first feeder and a second feeder, the first and second feeders adapted to feed the severed sugarcane stalk, the first cutter and the first feeder arranged to rotate relative to one another about a first rotation axis, the second cutter and the second feeder arranged to rotate relative to one another about a second rotation axis;
a cutter drive coupled to the first cutter and the second cutter to rotate the first cutter and the second cutter respectively about the first rotation axis and the second rotation axis; and
a feed drive coupled to the first feeder and the second feeder to rotate the first feeder and the second feeder respectively about the first rotation axis and the second rotation axis, the feed drive comprising a planetary gear set.

14. The basecutter assembly of claim 13, wherein the cutter drive is coupled to the planetary gear set to provide a drive input to the planetary gear set.

15. The basecutter assembly of claim 13, comprising a variator, wherein the variator is coupled to the planetary gear set to provide a variable drive input to the planetary gear set.

16. The basecutter assembly of claim 15, wherein the planetary gear set comprises a sun gear and a ring gear, the cutter drive is coupled to the planetary gear set to drive the sun gear, and the variator is coupled to the ring gear to drive the ring gear.

17. The basecutter assembly of claim 13, wherein the feed drive comprises a feed gear set coupled to the first feeder and the second feeder to rotate the first feeder and the second feeder respectively about the first rotation axis and the second rotation axis, and the planetary gear set is coupled to the feed gear set to drive the feed gear set.

18. The basecutter assembly of claim 17, wherein the planetary gear set comprises a planet carrier, and the planet carrier is coupled to the feed gear set to drive the feed gear set.

19. The basecutter assembly of claim 17, comprising a variator, wherein the planetary gear set comprises a sun gear, a ring gear, planet gears engaging the sun gear and the ring gear, and a planet carrier coupled to the planet gears, the cutter drive comprises a first cutter output gear coupled to the first cutter to rotate the first cutter about the first rotation axis and a second cutter output gear coupled to the second cutter to rotate the second cutter about the second rotation axis, the feed drive comprises a first feed output gear coupled to the first feeder to rotate the first feeder about the first rotation axis, a second feed output gear coupled to the second feeder to rotate the second feeder about the second rotation axis, and a feed idler gear engaging the second feed output gear, the first cutter output gear is coupled to the planetary gear set to drive the sun gear, the variator is coupled to the ring gear to drive the ring gear, and the planet carrier is coupled to a feed input gear of the feed gear set to rotate the feed input gear, and the feed input gear engages the first feed output gear and the feed idler gear.

20. The basecutter assembly of claim 19, wherein the variator is configured as a hydraulic variator and comprises an input member and an output member, the second cutter output gear engages the input member to drive the input member, and the output member engages the ring gear to drive the ring gear.

\* \* \* \* \*